W. G. BEATTY.
COUPLING.
APPLICATION FILED FEB. 23, 1916.
1,215,763.
Patented Feb. 13, 1917.
2 SHEETS—SHEET 1.
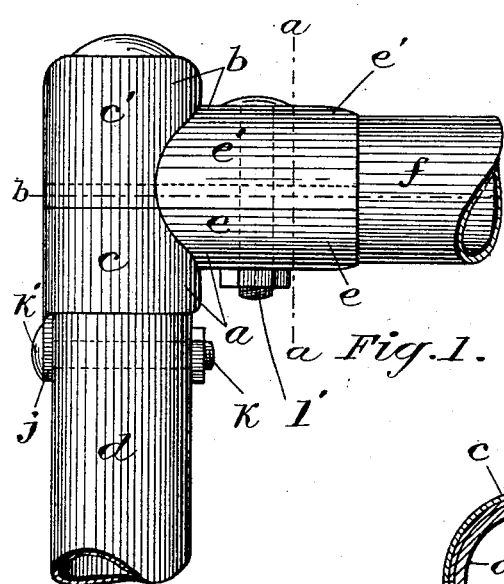
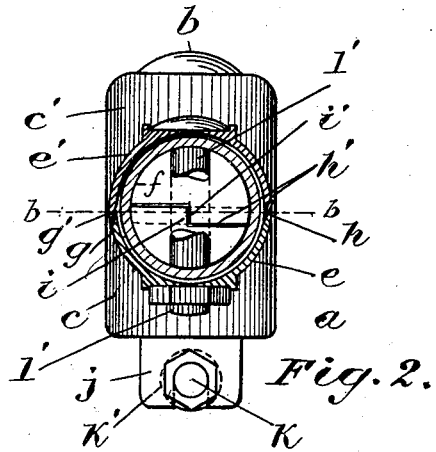
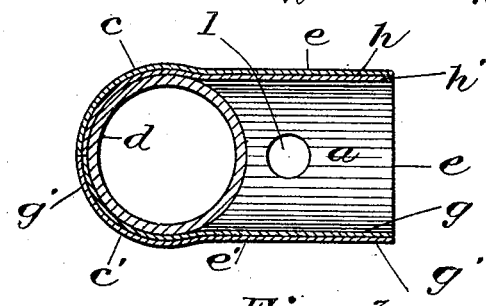
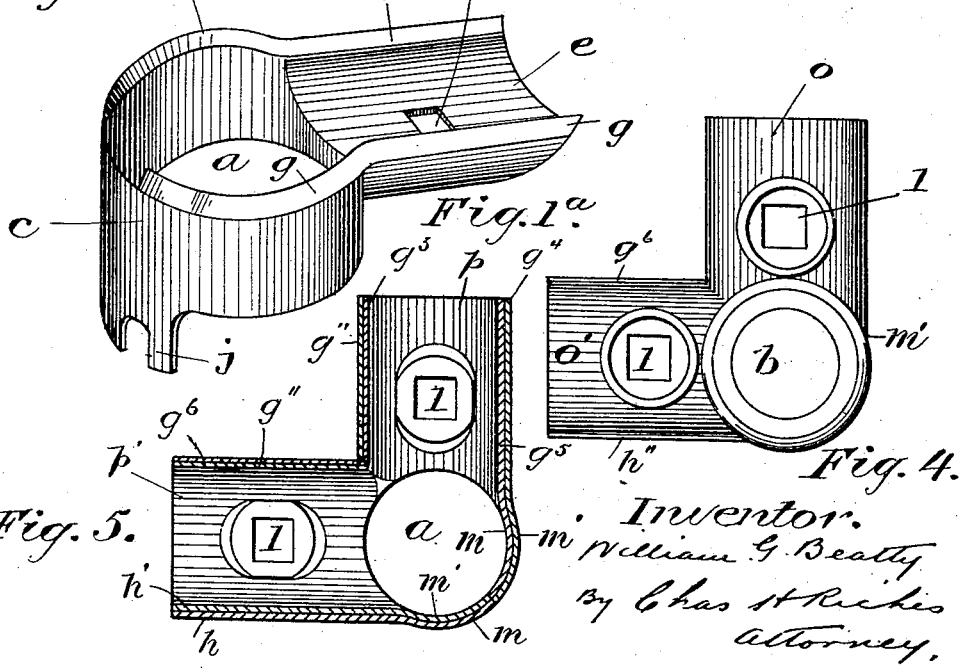
Inventor.
William G. Beatty
By Chas H Riches
Attorney.

W. G. BEATTY.
COUPLING.
APPLICATION FILED FEB. 23, 1916.

1,215,763.

Patented Feb. 13, 1917.
2 SHEETS—SHEET 2.

Inventor.
William G. Beatty.
By Chas H Riches
Attorney.

UNITED STATES PATENT OFFICE.

WILLIAM GEORGE BEATTY, OF FERGUS, ONTARIO, CANADA.

COUPLING.

1,215,763.  Specification of Letters Patent.  Patented Feb. 13, 1917.

Application filed February 23, 1916. Serial No. 80,085.

*To all whom it may concern:*

Be it known that I, WILLIAM GEORGE BEATTY, of the town of Fergus, in the county of Wellington and Province of Ontario, Dominion of Canada, have invented certain new and useful Improvements in Couplings; and I hereby declare that the following is a full, clear, and exact description of the same.

This invention relates to a coupling divided in a horizontal plane to form two vertically-separable and substantially-similar coupling members locked together by one or more clamping bolts or other appropriate fasteners, the coupling members being provided with interlocking edges, of which the interlocking edge at one side of the axis of each coupling member preferably underlies, and the interlocking edge at the other side of the axis preferably overlies, the corresponding edge of the other coupling member to coöperate with the clamping bolt or bolts or other appropriate fastener in securely and correctly maintaining the coupling members in their assembled condition to connect the horizontal rail or the like to the vertical post, the lower one of the coupling members being removably supported in a set position on the post.

For an understanding of the invention, reference is to be had to the following description and to the accompanying drawings, in which—

Figure 1, is a side elevation of a coupling for the end post and a horizontal rail, shown in section in Figs. 2 and 3, or the corner post, shown in plan in Fig. 4 and section in Fig. 5;

Fig. 1$^a$, is a perspective view of the lower coupling member shown in Fig. 1;

Fig. 1$^b$, is a fragmentary perspective view of the horizontal rail shown in Fig. 1;

Fig. 2, is a vertical sectional view on the line $a$—$a$, Fig. 1;

Fig. 3, is a horizontal section on the line $b$—$b$, Figs. 1 and 2;

Fig. 4, is a plan view of a coupling for a corner post and two horizontal rails at right angles to each other;

Fig. 5, is a horizontal section of the coupling shown in Fig. 4, taken on the plane $b$—$b$, Fig. 1;

Like characters of reference refer to like parts throughout the specification and drawings.

Figure 7:
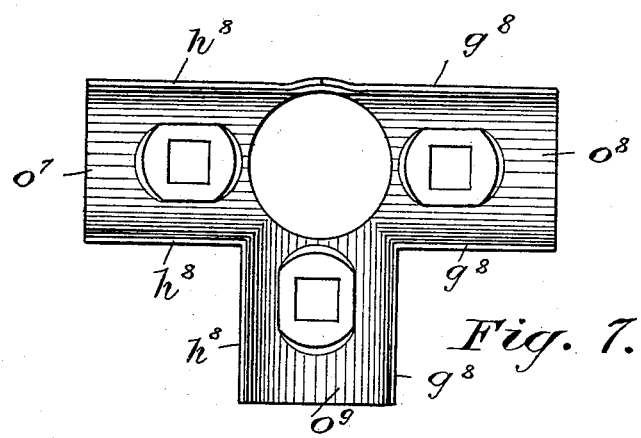
Fig. 7, is a plan view of one of the members of a three-way coupling.

Each coupling shown in the drawings consists essentially of two coupling members $a$ and $b$, divided in a horizontal plane to be vertically separable. In Fig. 1, the coupling member $a$ is shown to consist of a cylindrical sleeve $c$ to encircle the vertical post $d$, and a semi-cylindrical sleeve $e$ extending horizontally from the sleeve $c$ to partly encircle the horizontal rail $f$. The coupling member $b$ consists of a cylindrical sleeve $c'$, also encircling the vertical post $d$, and a semi-cylindrical sleeve $e'$ partly encircling the horizontal rail $f$ and forming with the semi-cylindrical sleeve $e$ a socket to completely contain the rail.

The interlocking meeting edge $g$ of the coupling member $a$, at one side of the axis of the coupling, is beveled or slopes inwardly to underlie the interlocking meeting edge $g'$ of the coupling member $b$, while the interlocking meeting edge $h$ of the coupling member $a$ at the other side of the axis of the coupling, is beveled or slopes outwardly to overlie the corresponding interlocking meeting edge $h'$ of the coupling member $b$.

The underlying meeting edge of each coupling member extends slightly beyond the overlying meeting edge, and these underlying meeting edges, where they terminate, form engaging shoulders $i$, $i'$ which coöperate with the interlocking meeting edges to prevent the rotary movement of the coupling members around the vertical axis of the sleeves $c$, $c'$, independently of each other.

As shown in the drawings, each of the coupling members $a$ is formed with a downwardly-extending bifurcated lug $j$ to straddle an appropriate abutment, bolt, rivet, pin or the like $k$, inserted in or through the post $d$ for the purpose of supporting the coupling member in its set position, the abutment, bolt, rivet, pin or the like preferably having a head $k'$ which overlies the forks of the lug. Instead, however, of providing the coupling member $a$ with a bifurcated lug, it is possible to insert the bolt, rivet, pin or the like through the cylindrical sleeve $c$ of the coupling member $a$, this, however, entailing the special boring of the sleeve for that purpose. In both these cases, the supporting bolt, rivet, pin or the like $k$ prevents the rotation of the coupling upon the post, and consequently maintains the coupling correctly in its set position. Where it is not necessary to prevent the movement of the coupling upon the post, the bolt, rivet or pin $k$ may be inserted in the post and the bottom edge of the sleeve $c$ may rest upon it.

Formed vertically through the semi-cylindrical sleeves $e$ and $e'$ of the coupling members $a$ and $b$ are bolt holes $l$ for the clamping bolt $l'$, by means of which the coupling members are locked in their assembled condition and drawn tightly together to clamp the horizontal rail in place.

In connecting the horizontal rails and the like to the vertical posts, the coupling member $a$ is placed with the cylindrical sleeve $c$ encircling the post until it is seated upon the abutment or bolt $k$, so located with respect to the coupling that the semi-cylindrical sleeve $e$ will be at the correct elevation with regard to the position of the horizontal rail. The horizontal rail is then laid in the semi-cylindrical sleeve $e$ and the coupling member $b$ is placed in position with its cylindrical sleeve $c'$ encircling the post and its semi-cylindrical sleeve $e'$ in line with the semi-cylindrical sleeve $e$ and horizontal rail. The coupling member $b$ is then pressed downward upon the coupling member $a$ until its edges $g'$, $h'$ interlock with the corresponding edges $g$ and $h$ of the coupling member $a$ and its engaging shoulder $i'$ abuts the engaging shoulder $i$.

This brings the bolt holes $l$ into vertical alinement to receive the clamping bolt $l'$ which, when tightened, draws the coupling members $a$ and $b$ tightly together and securely holds them in their assembled position.

When necessary, the horizontal rail $f$ may be bored, as shown at $f'$ to receive the clamping bolt $l'$, the clamping bolt then preventing the longitudinal movement of the rail in the socket formed by the semi-cylindrical members should the diameter of the rail be less than that of the bore of the socket. However, when the diameter of the rail is properly proportioned to the bore of the socket formed by the semi-cylindrical sleeves, the clamping pressure of these semi-cylindrical sleeves upon the rail is ordinarily sufficient to hold it securely against longitudinal movement as well as against lateral movement in any radial direction from the vertical axis of the sleeves $e$, $e'$.

By means of the foregoing construction, it is possible to prevent the movement of either of the coupling members independently of the other and to maintain a rigid connection between the vertical post and horizontal rail when the clamping bolt has been properly tightened.

In regard to the corner post coupling shown in Figs. 4 and 5, the cylindrical sleeves $m$, $m'$ of the coupling members $a$ and $b$ respectively, are each formed with two projecting semi-cylindrical sleeves $o$, $o'$ and $p$, $p'$ respectively, formed as described with respect to the cylindrical sleeves $c$, $c'$ and semi-cylindrical sleeves $e$, $e'$ and disposed at right angles to each other, for the purpose of connecting to the vertical post two horizontal rails at right angles to each other, as shown in Figs. 4 and 5.

Figure 6:
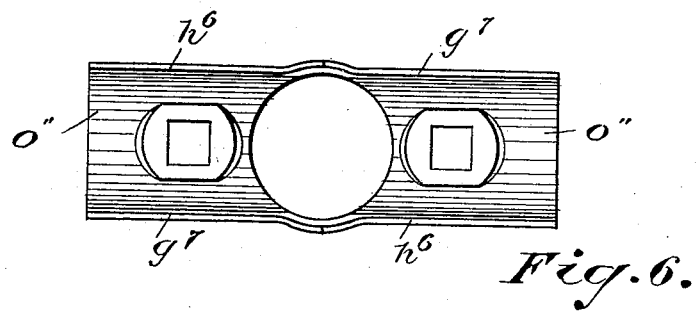
Fig. 6, is a plan view of one of the members of a straightway coupling.

In Fig. 6, the cylindrical sleeves $q$ of each of the coupling members are shown to be provided with semi-cylindrical sleeves $r$ in diametrical alinement to form a straightway coupling for connecting two horizontal rails in line with each other to the vertical post.

In Fig. 7 is shown a three-way coupling in which two of the semi-cylindrical sleeves $s$ are in diametrical alinement and a third sleeve is at right angles to the semi-cylindrical sleeves $s$.

Figure 8:
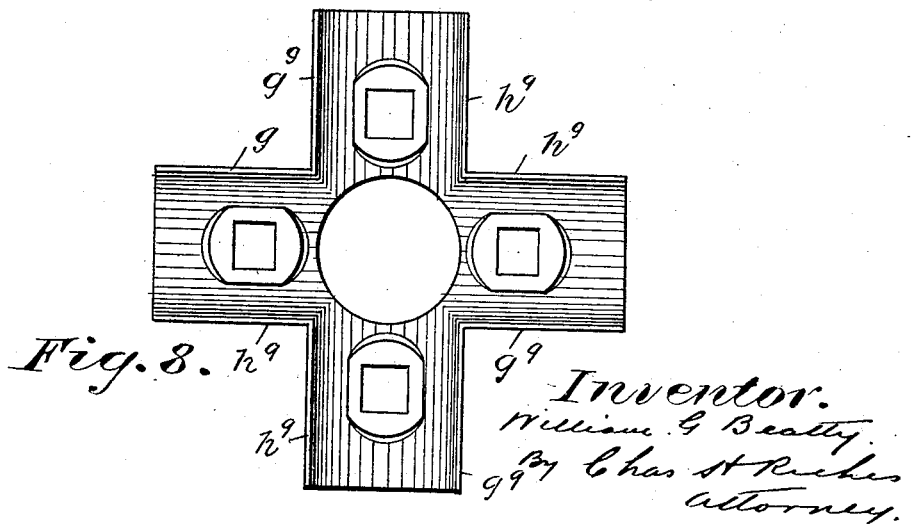
Fig. 8, is a plan view of one of the members of a four-way coupling.

In Fig. 8 is shown a four-way coupling comprising two pairs of semi-cylindrical sleeves $t$, $t'$ with the sleeves of each pair in diametrical alinement, the pair of sleeves $t$ being arranged at right angles to the sleeves $t'$.

All of the semi-cylindrical sleeves shown in Figs. 4 to 8 inclusive are formed with engaging shoulders $i$, $i'$ and interlocking meeting edges $g$, $g'$, $h$, $h'$, after the manner described in Fig. 1, and for the same purpose.

In all of the figures of the drawings, the coupling member $a$, whether it is constructed to connect one horizontal rail to the vertical post, or whether constructed to connect more than one horizontal rail to the vertical post, consists of two separable coupling members divided in a horizontal plane so that the uppermost coupling member can be raised and each horizontal rail laid in its respective socket, after which the upper coupling member can be replaced, correctly fitted to its corresponding coupling member, the coupling members then being clamped together by the bolt $l'$ to lock them in their assembled condition and rigidly connect the horizontal rail to the vertical post.

Various modifications may be made in respect to the foregoing construction within the scope of the appended claims, without departing from the principle of the invention.

In Fig. 4, the edges $g^6$ and $h''$ of the sleeve $p'$ are shown to overlie the edges $g''$ and $h'$ of the sleeve $o'$, and the edges $g^3$ and $g^5$ of the sleeve $p$ are shown to underlie the edges $g''$ and $g^4$ of the sleeve $o$.

In Fig. 6, the edges $h^6$ of the semi-cylindrical sleeves $o''$ are arranged to overlie, and the edges $g^7$ are arranged to underlie the corresponding edges of the other coupling part.

In Fig. 7, the edges $g^8$ of the sleeves $o^8$, $o^9$, are arranged to overlie, and the edges $h^8$ of the sleeves $o^7$, $o^9$ are arranged to underlie the corresponding edges of the other coupling part.

In Fig. 8, the edges $g^9$ of the horizontal sleeves are arranged to overlie, and the edges $h^9$ of the same sleeves are arranged to underlie, the corresponding edges of the other coupling part.

Having thus fully described the nature of my invention, what I claim as new and desire to secure by Letters Patent, is:—

1. A coupling for posts, rails, or the like, comprising two separable and substantially-similar coupling members each provided with a cylindrical sleeve for a vertical post, and a semi-cylindrical sleeve extending horizontally from the cylindrical sleeve to partly encircle a horizontal rail, the interlocking meeting edge at one side of each coupling member being formed to underlie, and the interlocking meeting edge at the other side of each coupling member being formed to overlie, the corresponding interlocking meeting edge of the other coupling member, the underlying meeting edge of each coupling member extending slightly beyond the overlying meeting edge, and these underlying meeting edges where they terminate forming engaging shoulders coöperating with the interlocking meeting edges to prevent the rotary movement of the coupling members around the vertical axis of the cylindrical sleeves independently of each other.

2. A coupling for posts, rails, or the like, comprising two separable and substantially-similar coupling members each provided with a cylindrical sleeve for a vertical post, and a semi-cylindrical sleeve extending horizontally from the cylindrical sleeve to partly encircle a horizontal rail, the interlocking meeting edge at one side of each coupling member being formed to underlie, and the interlocking meeting edge at the other side of each coupling member being formed to overlie, the corresponding interlocking meeting edge of the other coupling member, the underlying meeting edge of each coupling member extending slightly beyond the overlying meeting edge, and these underlying meeting edges where they terminate forming engaging shoulders coöperating with the interlocking meeting edges to prevent the rotary movement of the coupling members around the vertical axis of the cylindrical sleeves independently of each other, the cylindrical sleeve of one of the coupling members being formed with a bifurcated lug to straddle an appropriate abutment to support the coupling in its set position.

Toronto, February 8th, 1916.

WILLIAM GEORGE BEATTY.

Signed in the presence of—
CHAS. H. RICHES,
EDWARD S. BERNSTEIN.